Oct. 12, 1943.  L. SCHECKWITZ  2,331,509
STAPLE DRIVING DEVICE
Filed Aug. 21, 1941   3 Sheets-Sheet 1
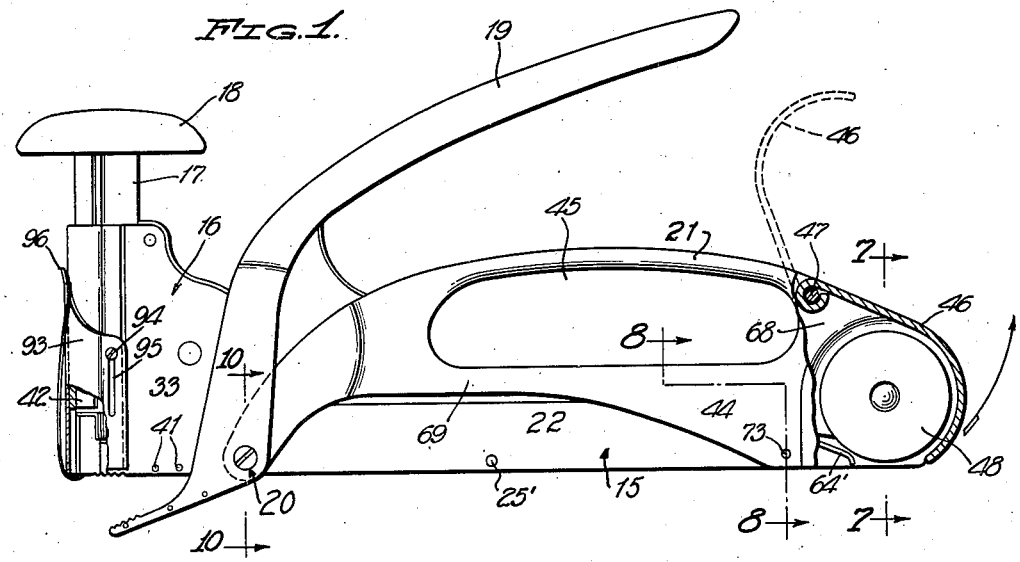
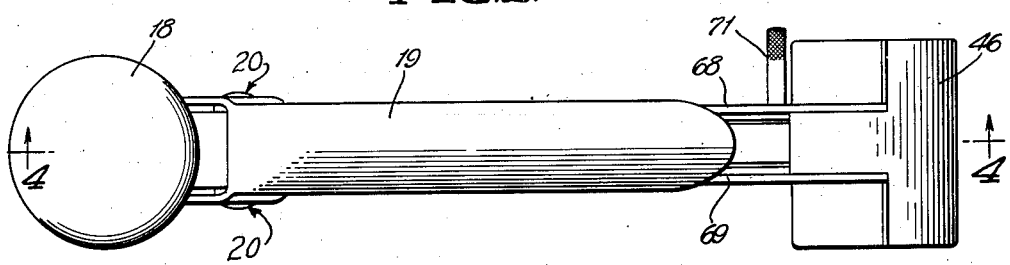
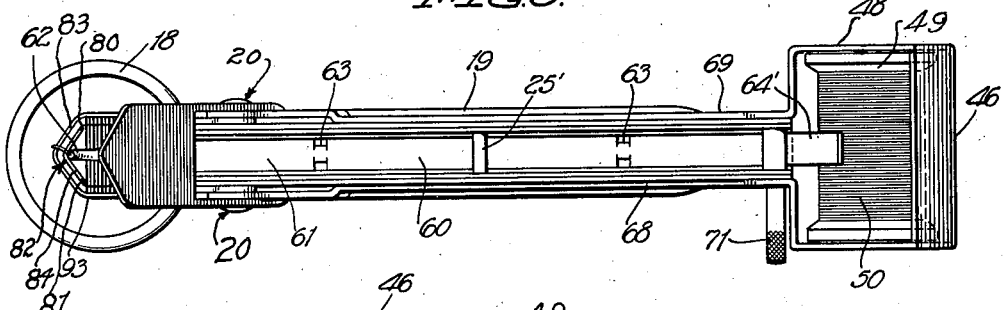
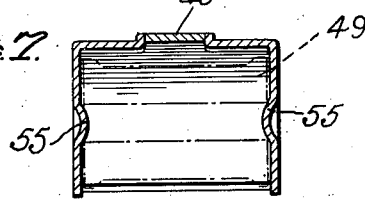
LOUIS SCHECKWITZ
INVENTOR.
BY Ely Pattison
ATTORNEYS.

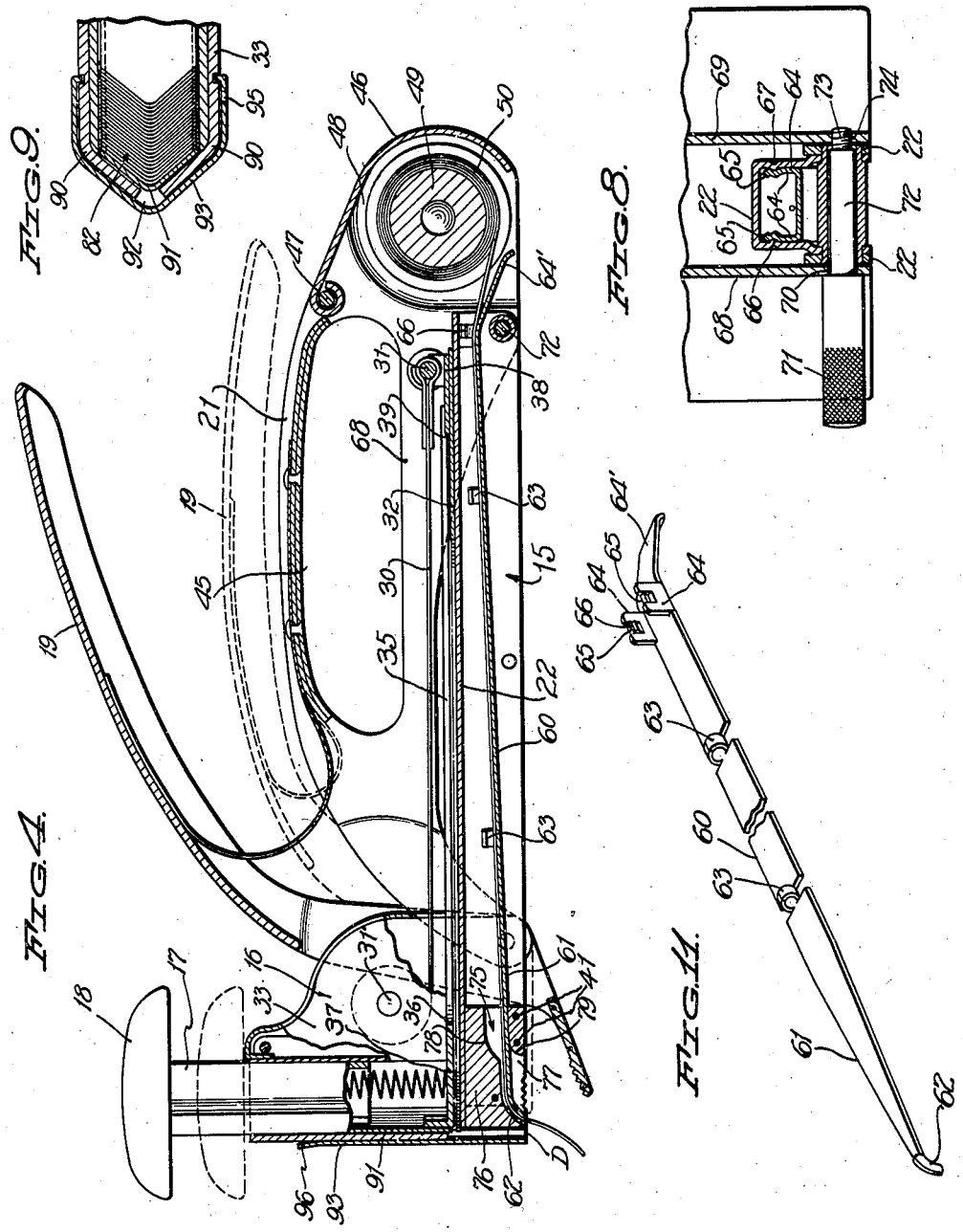

Oct. 12, 1943. L. SCHECKWITZ 2,331,509
STAPLE DRIVING DEVICE
Filed Aug. 21, 1941 3 Sheets-Sheet 3
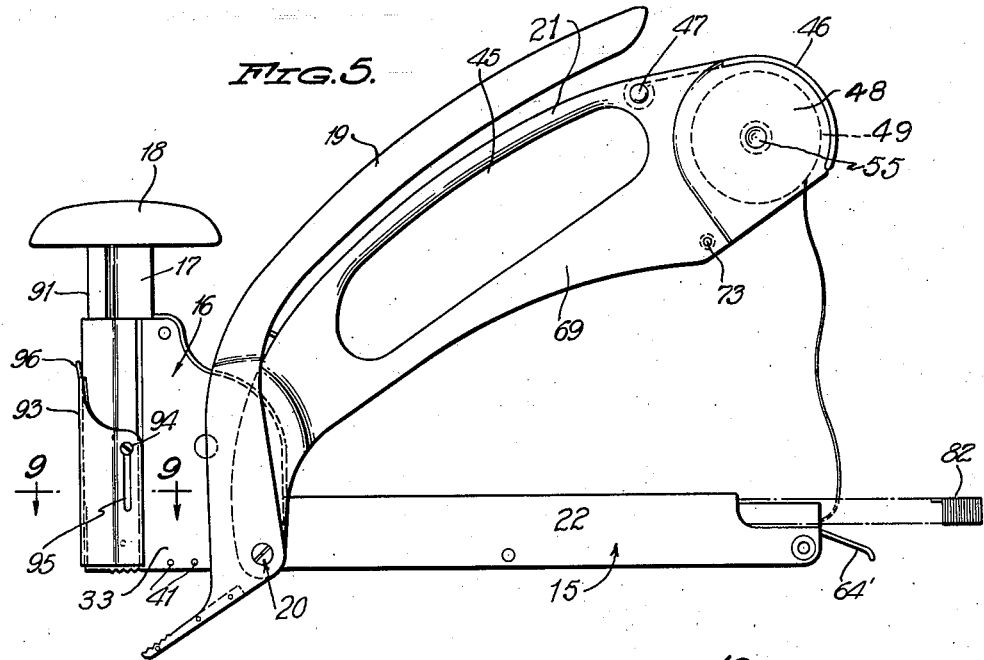
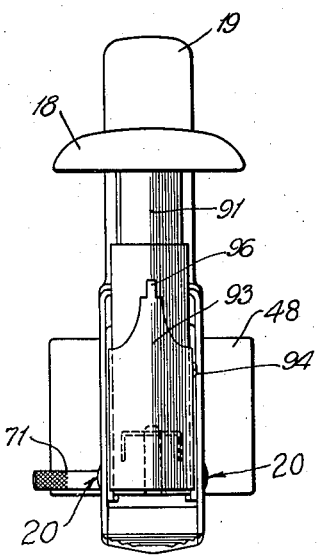
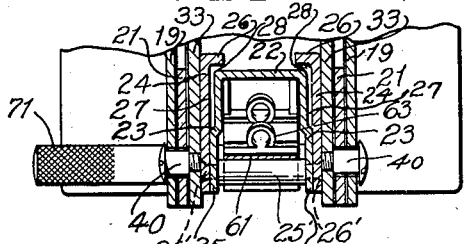
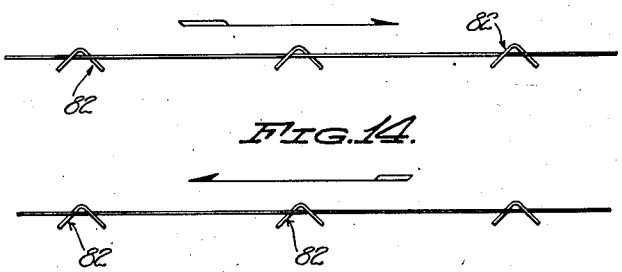
LOUIS SCHECKWITZ.
INVENTOR.
BY Ely Pattison
ATTORNEYS.
WITNESS:

Patented Oct. 12, 1943

2,331,509

UNITED STATES PATENT OFFICE 2,331,509

STAPLE DRIVING DEVICE

Louis Scheckwitz, Long Beach, N. Y.

Application August 21, 1941, Serial No. 407,755

3 Claims. (Cl. 1—49)

This invention relates to new and useful improvements in hand tools, and in its present embodiment, it is illustrated in a tool employed by furriers for securing skins in stretched form to a stretching board.

In this art, it is common practice to secure skins in stretched form, together with a pattern, to a board or similar support by means of staples. This operation is generally accomplished by a combination tool of the pliers type, which is engaged with the skin, the skin being then stretched and a small staple is then anchored in the board passing through the skin and pattern to secure them to said board.

After the skin becomes set, it is the customary practice to remove the skin and pattern from the board by grasping them, and together giving them a quick jerk to dislodge the staples from the board.

This practice has disadvantages, mainly in that while the fastening means or staples are readily enough dislodged from the board, they do not readily disengage the skin and pattern. When this results, it necessitates the independent removal of the staples from the skins or patterns or both.

Furthermore, this action sometimes results in a rupture of the skin, which is, of course, undesirable since such ruptures often result in sufficient damage to render the skin useless.

The present invention contemplates the provision of means for removing the staples from their anchorage in the board and from the skin and pattern as well without damage to either.

A feature of the invention resides in a combination tool of the type before mentioned, which will lay a rip thread beneath the heads of the staples as they are driven to set position by the stapling mechanism, the rip thread being secured to the board together with skin or a skin and pattern by the staples in such a manner that merely by pulling the same, the staple will be completely detached or removed with respect to the board and the skin and pattern.

A feature of the invention resides in the use of a novel form of staple, which, owing to its construction, insures the removal of the staples by means of the rip thread.

A further feature of the invention resides in a novel construction and arrangement of parts in combination with the staple structure, whereby the rip thread will be laid beneath the staple heads regardless of direction of operation of the tool. That is to say, that the tool may be moved by the operator, either in the direction of from left to right or from right to left along the edge of the skin, and that in either case, the rip thread will always occupy a position between the legs of the staple and beneath the head thereof.

It is an object of the invention so to construct the tool that it will be substantially similar in use to tools of the described type already employed for the purpose, thus rendering it unnecessary for operators to familiarize themselves with a new use and method of operation.

In the accompanying drawings, I have illustrated the invention as embodied in a furrier's tool as heretofore mentioned. It is to be understood, however, that the invention is not limited to use in connection with such tools, and that it may be embodied in any type of stapling device in which a plurality of staples are set in spaced relation to one another and which are subsequently to be removed.

One example of such alternate use would be a stapling device employed by window dressers, in which operation a tape or ribbon is employed, and the staples are driven through the tape or ribbon to secure it in position. In such use the tape or ribbon would serve the purpose of the rip thread and would be fed through the machine in lieu thereof.

Reference will now be had to the accompanying drawings, wherein a tool constructed in accordance with the present invention is illustrated, and in which, Figure 1 is a view in side elevation of a tool constructed in accordance with the present invention.

Figure 2 is a top plan view thereof.

Figure 3 is an inverted or bottom view thereof.

Figure 4 is a longitudinal vertical sectional view on an enlarged scale taken substantially on the line 4—4 of Figure 2.

Figure 5 is a view in side elevation with certain of the parts in different positions than that in which they are illustrated in Figure 1.

Figure 6 is a view in front elevation of the device.

Figure 7 is a vertical sectional view taken substantially on the line 7—7 of Figure 1.

Figure 8 is a vertical sectional view taken substantially on the line 8—8 of Figure 1.

Figure 9 is a detailed horizontal sectional view taken substantially on the line 9—9 of Figure 5.

Figure 10 is a vertical sectional view taken substantially on the line 10—10 of Figure 1.

Figure 11 is a perspective view of the rip thread guiding member.

Figure 12 is a detailed perspective view illustrating one form of staple employed.

Figure 13 is a schematic view illustrating the manner in which the rip thread is laid beneath the heads of the staples when the device is operated in a direction from left to right, and;

Figure 14 is a schematic view showing the manner in which the rip thread is laid beneath the heads of the staples when the device is moved in a direction from right to left.

A device constructed in accordance with the present invention includes a body portion 15, a staple setting mechanism 16, which includes a manually operated staple setting plunger 17, having a head 18 and a gripping jaw 19, which is pivotally mounted as at 20 upon the body portion. There is also a pivoted hand grip 21, which is also pivotally mounted as at 20 upon the body portion 15.

By reference to Figure 4, it will be noted that the body portion 15 consists of an elongated, inverted channel shaped member formed of sheet metal. This inverted channel member is designated 22, and by reference to Figure 10, it will be noted that the side walls thereof are offset as at 23, the purpose of which will later be apparent.

The reference numeral 24 designates side plates which are positioned against the outer face of the offset portions 25 of the channel member and the upper edge of each of these plates 24 is formed with an inwardly disposed flange 26.

This construction provides a guide channel 27 upon each side of the channel member 22 above the offset portions 23 of the side walls, each of which channels has a right angular upper portion 28 beneath the inwardly turned flanges 26 heretofore mentioned. The side plates 24 are secured to the offset portions 25 of the channel member by means of a transversely extending rivet 25', which has end portions 26', which are upset to form the rivet heads.

This construction provides a feeding channel for the fastening elements, which in the present instance are in the form of staples. Means is provided to feed the staples longitudinally of the body portion 15 to the stapling mechanism 16. This means is preferably of conventional type, and includes a ribbonlike spring 30 connected as at 31 to a follower 32 positioned behind the staples, the other end of the spring being wound upon a core 34' within the stapling mechanism 16.

The follower connection 31 moves through the slot 35 between the flanges 26, which slot terminates in an end wall 36, as best shown in Figure 4. The forward portion of the follower slides beneath the forward portion 37 which is an integral part of the plates 24 carried by the channel member 22 beneath the end wall 36, and said follower has a plate 38, the forward portion 39 of which engages the end wall 36 of the slot 35 to limit forward movement of the follower.

The pivotal points 20 of the gripping jaw 16 and the hand grip 21 are formed by screws 40, there being one of these screws threaded in each of the side plates 33 of the stapling mechanism, see Figure 10 of the drawings.

By this construction, the gripping jaw and the hand grip are capable of independent pivotal movement relative to the body member 15 and relative to each other.

The stapling mechanism 16 is secured to the forward end of the body member 15, by means of rivets or the like 41. As the staples are fed through the feed channel 27, they will be presented singly to the staple setting plunger 42 of the stapling mechanism.

The hand grip 21 consists of a sheet metal housing 44, having an open portion 45 through which the fingers of the hand may be passed. The rear end of this hand grip is provided with a hinged cover 46, pivotally mounted as at 47 for movement to either open or closed position as illustrated in Figure 1. This cover 46, together with the side walls of the hand grip, provides a housing 48 for a spool 49 of thread, the thread being designated 50, which thread 50 is the thread heretofore referred to as the rip thread. The spool 49 is retained in position in the housing by means of two projections 55 formed by indenting the side walls of the hand grip, see Figure 7, these projections extending into the ends of the passage through the spool.

Means is provided for adjusting the tension upon the spool 49 and thereby controlling the rate of speed at which the thread unwinds therefrom, and this means will hereafter be described.

As heretofore stated, the body member 22 is of inverted channel form and it is within this body member that the thread guide which guides the thread from the spool 49 at the rear of the tool to the staple setting position at the forward end thereof, is carried.

The thread guiding means is illustrated in detail in Figure 11, and it comprises a relatively narrow elongated body portion 60, the forward portion of which is tapered as at 61. At its forward extremity, the tapered portion 61 is formed with a nose portion 62 which has a thread passage therethrough.

Intermediate of its ends, the body portion is provided with thread guides 63, which may be formed by slitting the body transversely and rolling that portion thereof which lies between the slits as illustrated in said Figure 11.

The rear end of the body portion 60 is bent downwardly as at 64' to provide means by which the thread guide may be grasped to remove it from the body portion in a manner which will be more specifically set forth.

Adjacent the rear end of the thread guide, there are two oppositely disposed upstanding lugs 64, each of which is formed with a spring finger 65, each of which has a notch or recess 66 upon its inner face.

As illustrated in Figure 8, the notches 66 engage projections upon the inner walls of the channel-like body member to retain the thread guide in position, the projections being formed by indentations 67 formed in the outer faces of the side walls of the inverted channel member 22.

In Figure 3, there is also shown the means for holding the hand grip 21 immovable with respect to the body member 22 when the device is in operation, which means is also employed to exert tension upon the spool 49, and this construction and its functions will now be described.

Referring to Figure 8, the reference characters 68 and 69 designate the side walls of the housing 44 of the hand grip 21. The side wall 68 has an opening 70 therethrough for the reception of the reduced portion 72 of a bolt 71. The bolt 71 has a reduced end portion 73 which is threaded for engagement in a threaded opening 74 in the side wall 69, which bolt 71 also passes through the side walls of the inverted channel member 22.

By this construction, it will be apparent that as the bolt 71 is tightened, the body member 22 will be retained in position, and the side walls of the housing 44 will be contracted to exert more or less pressure upon the ends of the spool 49 to produce proper tension upon the thread.

The forward end of the thread guide, or, the nose portion 62 thereof is downwardly curved in order to deliver the thread to the staple setting location which is designated D in Figure 4.

By reference to Figure 4, it will be seen that the forward end of the thread guide lies within a passage 75 in a base block 76 carried by the stapling mechanism.

The forward portion of the upper wall of this passage conforms in shape to the upper curve of the nose portion 62 of the thread guide, the forward end of which rests upon the lower wall 76 of the passage 75, the forward portion of which is cut away as at 77. The rear portion of the upper wall of the passage 75 is enlarged as at 78, the purpose of which will now be described.

By reference to Figures 4 and 8, it will be apparent that after the bolt 71 has been removed, the thread guide may be moved rearwardly of the body portion 22 in a straight line until the downwardly curved nose 62 thereof engages the forward edge 79 of the bottom wall of the passage 75. In this position, the rear end of the thread guide may be rocked downwardly by reason of the enlarged portion 78 of the upper wall of the passage 75, thus permitting the removal of the thread guide when it becomes necessary to thread a new thread therethrough.

The staple which is employed in connection with the present device is of novel construction and is illustrated in Figure 12.

This staple comprises two leg members 80 and 81. The leg members 80 and 81 are connected by a head member 82 which head member includes two angularly disposed arms 83 and 84 respectively to the legs 80 and 81.

By this construction, the head 82 of the staples is projected forwardly of the legs to a position out of alinement therewith and preferably in a plane at right angles to the longitudinal axis of said legs as best illustrated in Figures 12 and 13.

While I have illustrated this staple as comprising but two angularly disposed and connected arms, it may consist of a single member of arcuate form, or the whole head member 82 could be of semi-hexagonal shape or of any shape, as a matter of fact, which would throw the head forwardly or rearwardly out of alinement with the legs.

This construction of staple I consider important since it permits of laying the rip thread beneath the staple in all positions of operation of the tool.

For example, in stapling skins and patterns to a stretching board, the skin and pattern is gripped by the tool with the tool in a position at substantially right angles to the edge of the skin and pattern. If the staple were of the conventional form, there would be no assurance that the rip thread would be positioned beneath the head and between the legs of the staple.

By forming the head of the staple in such a manner that it is projected forwardly of the legs thereof, it permits of laying the rip thread at a point in advance of the legs of the staple and thus insures the laying of the thread between the said legs and beneath the head of the staple in either a right or left hand direction of movement of operation of the tool.

By reference to Figure 3 of the drawings, it will be apparent that the rip thread is delivered at a point forwardly of the legs of the staple and just behind the connecting point of the two arms 83 and 84 which form the head of the staple.

If now the tool as shown in Figure 3 be moved in a direction downwardly of the sheet, the rip thread will be laid over the lower arm and under the upper arm of the head of the staple in said figure. Such operation is equivalent to the movement of the tool from a fixed point towards the right, as illustrated in Figure 13 of the drawings. If, on the other hand, the tool be moved in an upward direction in Figure 3, the rip thread will be laid beneath the lower arm of the head of the staple and over the upper arm of the staple in said figure. Such operation is equivalent to the movement of the tool from a fixed point towards the left as illustrated in Figure 14 of the drawings.

Thus it will be apparent that by reason of the construction of the head of the staple, the rip thread is at all times positioned beneath the head and between the legs of the staple.

As best illustrated in Figure 9, the side plates 33 of the stapling mechanism 16 have their forward vertical edges bent inwardly as at 90, and the staple setting plunger which is designated 91, is substantially V-shaped in cross section as also illustrated in said figure. By this construction, the staple is prevented from rocking when the setting pressure is applied thereto by the staple setting plunger 91.

It will be noted by reference to Figure 9, that the forward vertical edges of the side plates 33 of the stapling mechanism do not meet. This construction provides a space 92 which permits of access to the staples and staple setting plunger to permit of removal of a damaged staple which might clog or otherwise hinder the operation of the stapling mechanism.

The space 92 is normally closed by means of a vertically sliding plate 93, which is retained in its closing position by a bolt or screw 94 operating in a slot 95 in the plate 93, see Figure 1.

The plate 93 has a thread cutting and holding finger 96 upon its upper edge behind which the thread may be passed to sever the same or behind which the free end of the thread may be held when the tool is not in use.

In operation, the rip thread is fed from the spool merely by movement of the tool from one operative position to another, the thread being held by the last driven staple during such movement of the tool.

When it is desired to remove a skin, or a skin and pattern from a stretching board to which it has been secured in the manner hereinbefore described, it is only necessary to grasp one end of the rip thread and exert a pull thereon. This action will not only remove the staples from their anchorage in the stretching board, but will insure their complete removal from the skin and pattern and render unnecessary individual removal of any of the staples from the skin or pattern.

From the foregoing, it will be apparent that the present invention provides a tool and special type of staple whereby the several recited objects of the invention may be accomplished.

Having thus described the invention, what I claim as new is:

1. In a staple driving device in combination, a laterally extending base member, an upstanding staple driving mechanism, means for feeding staples along the base member to the staple driving mechanism, a hand grip mounted upon the base member and overlying the same, a rip thread carrying chamber carried by the hand grip, means for guiding a rip thread from the rip thread chamber to the stapling mechanism, and means at the staple driving mechanism for positioning the rip thread between the legs of the staple prior to the setting of the staple by the staple driving mechanism.

2. In a staple driving device in combination, a hollow main body member, a staple driving mechanism, means for feeding a plurality of staples to said staple driving mechanism, means for supporting a rip thread upon the body member, and means for guiding said rip thread from its support through the hollow body member to the staple driving location of the device, said rip thread guiding means comprising a rigid elongated member removably carried within the hollow body member.

3. In a staple driving device in combination, a hollow main body member, a staple driving mechanism, means for feeding a plurality of staples to said staple driving mechanism, means for supporting a rip thread upon the body member, and means for guiding said rip thread from its support through the hollow body member to the staple driving location of the device, said rip thread guiding means comprising a rigid elongated member extending throughout the length of the hollow body member and insertable endwise into said hollow body member, and means for removably mounting said rip thread guiding means within said hollow body member.

LOUIS SCHECKWITZ.